(12) United States Patent
Voigt

(10) Patent No.: US 9,329,412 B2
(45) Date of Patent: May 3, 2016

(54) ELECTROOPTICAL DIGITAL WAVEGUIDE MODULATOR

(75) Inventor: Sven Voigt, Freiburg (DE)

(73) Assignee: Northrop Grumman Litef GmbH (DE)

( * ) Notice: Subject to any disclaimer, the term of this patent is extended or adjusted under 35 U.S.C. 154(b) by 0 days.

(21) Appl. No.: 13/878,197

(22) PCT Filed: Aug. 10, 2011

(86) PCT No.: PCT/EP2011/004009
§ 371 (c)(1),
(2), (4) Date: Apr. 5, 2013

(87) PCT Pub. No.: WO2012/048769
PCT Pub. Date: Apr. 19, 2012

(65) Prior Publication Data
US 2013/0202244 A1    Aug. 8, 2013

(30) Foreign Application Priority Data

Oct. 14, 2010   (DE) .......................... 10 2010 048 488

(51) Int. Cl.
*G02B 6/00* (2006.01)
*G02F 1/01* (2006.01)
*G01C 19/72* (2006.01)
*G02F 1/03* (2006.01)
*G02F 1/035* (2006.01)
*G02F 7/00* (2006.01)

(52) U.S. Cl.
CPC .............. *G02F 1/011* (2013.01); *G01C 19/721* (2013.01); *G02F 1/035* (2013.01); *G02F 1/0316* (2013.01); *G02F 7/00* (2013.01); *G02F 2201/122* (2013.01)

(58) Field of Classification Search
CPC ..................................... G02B 6/00; G02F 1/01
USPC ......................................................... 385/3, 14
See application file for complete search history.

(56) References Cited

U.S. PATENT DOCUMENTS

| | | | |
|---|---|---|---|
| 5,137,359 A * | 8/1992 | Steele ........................... | 356/464 |
| 5,289,454 A * | 2/1994 | Mohapatra et al. ......... | 369/44.12 |
| 6,504,640 B2 * | 1/2003 | Gopalakrishnan ............ | 359/245 |
| 2002/0110302 A1 * | 8/2002 | Gopalakrishnan ................ | 385/2 |
| 2002/0154842 A1 * | 10/2002 | Betts .................................... | 385/2 |
| 2002/0191886 A1 * | 12/2002 | Castoldi et al. .................. | 385/14 |
| 2003/0190107 A1 * | 10/2003 | Walker .............................. | 385/2 |
| 2005/0201686 A1 * | 9/2005 | Cole et al. ........................ | 385/40 |
| 2005/0285541 A1 * | 12/2005 | LeChevalier .............. | 315/169.3 |
| 2008/0205903 A1 * | 8/2008 | Yonenaga et al. ............. | 398/186 |
| 2011/0158576 A1 * | 6/2011 | Kissa et al. ........................ | 385/3 |
| 2012/0213531 A1 * | 8/2012 | Nazarathy et al. ............ | 398/202 |
| 2012/0251032 A1 * | 10/2012 | Kato ................................. | 385/3 |

FOREIGN PATENT DOCUMENTS

| | | |
|---|---|---|
| CN | 1751223 A | 3/2006 |
| DE | 19753427 C1 | 2/1999 |
| DE | 10307525 B4 | 9/2004 |

(Continued)

*Primary Examiner* — Kaveh C Kianni
(74) *Attorney, Agent, or Firm* — Tarolli, Sundheim, Covell & Tummino LLP

(57) ABSTRACT

A digital integrated optical modulator, in particular for a fiber optical signal transmission or measuring device, having two waveguide arms and electrodes that are arranged along both waveguide arms in or on an optical substrate, wherein the arrangements of the electrodes along the two waveguide arms are different from each other.

12 Claims, 2 Drawing Sheets

(56) References Cited

FOREIGN PATENT DOCUMENTS

| GB | 2185123 A * | 7/1997 |
| WO | WO 98/03895 | 1/1998 |
| WO | WO 2004074775 A1 * | 1/1998 |
| WO | WO 2004/074914 A1 | 9/2004 |
| WO | WO 2008/152642 A1 | 12/2008 |
| WO | WO 9803895 A1 * | 12/2008 |

* cited by examiner

ELECTROOPTICAL DIGITAL WAVEGUIDE MODULATOR

BACKGROUND

1. Field of the Invention

The invention relates to digital integrated optical modulators. More particularly, it pertains to a modulator for a fiber optic signal transmission or measuring device.

2. Description of the Prior Art

A digital phase modulator with increased resolution for a fiber optic signal transmission or measuring device is known from patent document DE 103 078 525 B4. As shown, the resolution of digital electrodes is increased to a range of 12 to 13 bits by combining binary and non-binary electrodes to form a coarse modulator and a fine modulator with the chip length required being the same as a binary 9-bit arrangement.

Although the above-described solution allows increased resolution of 12 or 13 bits while maintaining the total chip length, the resolution cannot be further increased with the described device because the total chip length cannot be kept in a configuration such as taught in DE 103 07 525 B4. This is due to the fact that total chip length required depends on the minimum overall length of the smallest electrode (LSB electrode). The bit weight for a very short LSB electrode (in particular for a binary/non-binary arrangement) can be precisely determined only with considerable difficulty. For this reason, certain minimum lengths are required for the LSB electrode. The length of the LSB electrode, in turn, also accounts for the length of the longest or most significant bit electrode (MSB electrode) which must be twice the length of the second longest electrode.

A digital phase modulator whose resolution is increased from 9 to 11 bits without alteration of chip length is taught in WO-A-2004/074914. Such reference teaches the arrangement of the electrodes into a plurality of groups of three each along the light guiding section with, within a group, two electrodes of successive lengths having the same length ratio.

A digital phase modulator for use in a fiber optic gyroscope is taught in WO-A-98/03895. In such modulator, the same pulse response is obtained in both light directions. According to an embodiment, the modulation electrodes, each rotated by 180 degrees in relation to one another, are arranged along the two waveguide arms that are disposed opposite a common counterelectrode.

Since technical requirements focus on resolution that is further increased by a 16-bit phase modulator, for example, in order to reduce the quantization error and, therefore, the quantization noise in a fiber optic gyroscope, a higher-bit design must be created without adversely changing the overall length.

In addition to applications of digital phase modulators in reciprocal interferometers (fiber optic gyroscope, fiber optic current sensor), applications are also possible in integrated optical amplitude modulators (Mach-Zehnder interferometers). Such digital modulators can be applied in satellite tracking for optical transmission in space or in digital laser exposure devices (digital generation of color grades). A further application is a digital frequency modulator in a laser Doppler anemometer. A phase modulator is, at the same time, a frequency modulator (generation of side bands). In general, it is possible to implement all of those applications that have so far used merely analog phase, frequency or amplitude modulation in connection with an integrated optical modulator.

SUMMARY AND OBJECTS OF THE INVENTION

It is an object of the present invention to provide a digital modulator for a fiber optic signal transmission or measuring device in which a 16-bit digital electrode arrangement can be implemented by an appropriate arrangement of the electrodes while maintaining total chip length.

The present invention addresses the foregoing object by providing a digital integrated optical modulator having two waveguide arms and electrodes that are arranged along both waveguide arms in or on an optical substrate.

According to the invention, the arrangements of the electrodes along the two waveguide arms differ from one another.

The preceding and other features of the invention will become further apparent from the detailed description that follows. Such written description is accompanied by a set of drawing figures. Numerals of the drawing figures, corresponding to those of the written description, point to the features of the invention with like numerals referring to like features throughout both the written description and the drawings.

DETAILED DESCRIPTION OF THE PREFERRED EMBODIMENT

Figure 1:
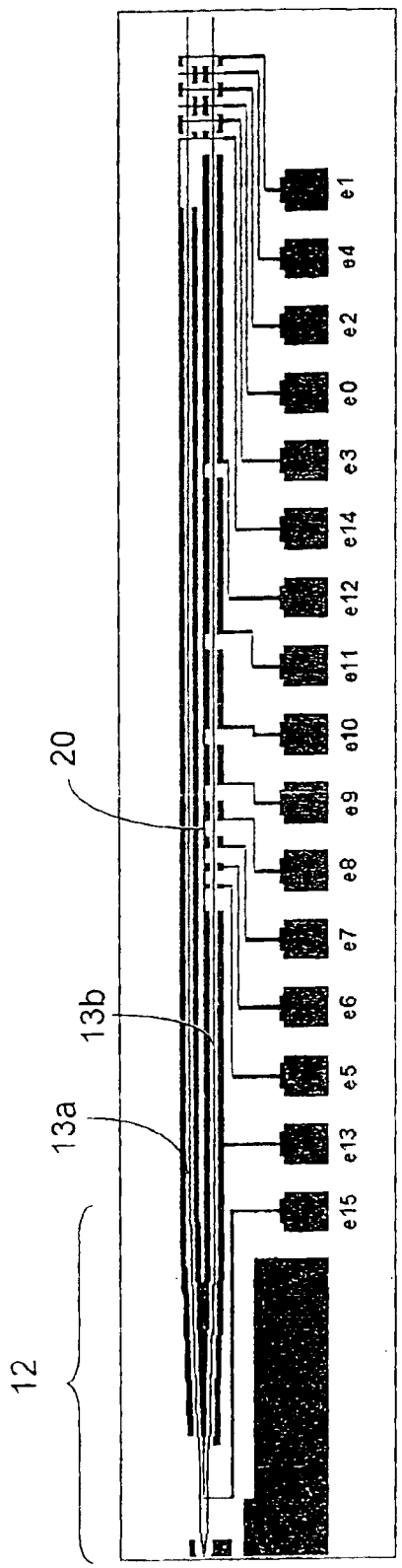
FIG. 1 illustrates an electrode arrangement of a 16-bit modulator.

In a practical exemplary embodiment of the invention, FIG. 1 illustrates a potential electrode arrangement of a 16-bit phase modulator having two waveguide arms 13a, 13b. (In FIG. 2, the individual waveguide sections are shown in an enlarged view, including an associated Y-branch 12. To simplify matters, only four electrodes (e10 to e15) are shown.) The phase modulator is a digital phase modulator for fiber optic signal transmission or measuring devices, comprising a plurality of electrodes e0 to e15 of varying lengths. The electrodes e0 to e15 are arranged along the two waveguide arms 13a, 13b in parallel thereto, in or on an optical substrate.

Depending on the position of the electrodes e0 to e15 in relation to a light guiding section or to the waveguide arm, the electrodes to which voltage has been applied produce a positive or a negative shift in light phase at the output of the modulator. The electrodes are, accordingly, referred to as "positive" and "negative" electrodes, respectively.

FIG. 1 shows that the longest (MSB=most significant bit) electrode e15 rests against both waveguide arms 13a, 13b. The electrodes e14 to e5 each rest against only one side of each waveguide arm 13a, 13b. The longest electrode e15 is subdivided into segments along the one waveguide arm 13b, whose segments each are arranged opposite the shorter electrodes e13 to e5 and are connected to each other via connecting lines 20.

Therein, a voltage that is, preferably, the same for all electrodes can be applied to the electrodes e0 to e15. This application of a voltage is such that a plurality of phase values is set by alternating activation selection of electrode combinations within a defined value range.

As a general rule, a modulator according to the invention is implemented as a structural unit inside or on a multifunctional integrated optical chip (MIOC) wherein polarization-preserving light guiding sections can be implemented as waveguide arms on or in the substrate of the multifunctional integrated optical chip. The substrate may, for example, be made of lithium niobate ($LiNbO_3$). In the event that a modulator is used for a fiber optic gyroscope (FOG), such a MIOC includes, for example, a polarizer in addition to a beam splitter. The modulator itself (i.e. its positive and negative electrodes that have different lengths) has an impact on the phases of the two opposite-sense light paths downstream of a branching. Since a MIOC with an integrated digital modulator is known in principle, details of no relevance will not be discussed in further detail.

Figure 2:
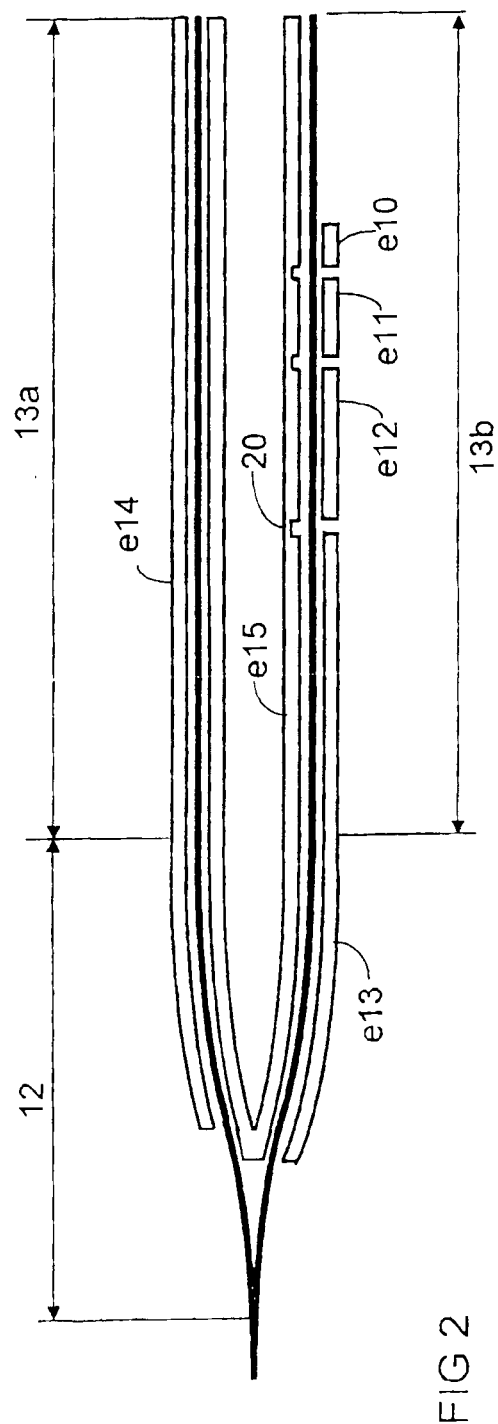
FIG. 2 illustrates the waveguide sections in an integrated optical modulator.

As is shown in FIG. 2, two parallel waveguide arms 13a, 13b for the forward and backward run of a polarized light wave running through the measuring coil of a fiber optic gyroscope extend downstream of the Y-branch 12. It is clearly visible that parts of the longest electrode e15 parts of the second longest electrode e14 as well are arranged in the vicinity of the Y-branch 12.

The electrodes e0 to e15 of the binary/non-binary 16-bit modulator according to the invention that are shown in FIG. 1 are arranged at the positions b0 to b15. The subdivision of the electrodes into binary and non-binary electrodes, as is already known (for example from DE 103 07 525 B4), is preserved.

In the embodiment of the invention according to FIG. 1, a "11+5 configuration" is provided in which the electrodes e5 to e15 have a binary weighting and form a group of electrodes referred to as "coarse modulator", while the electrodes e0 to e4 implement the desired increased resolution with an appropriate interconnection. This second group of electrodes forms a "fine modulator" whose arrangement will be represented in more detail in FIG. 3. All of the five electrodes e0 to e4 in the illustrated instance of the "fine modulator" should have varying sizes to prevent extinctions.

Since the electrodes are distributed over the two waveguide arms in a free arrangement, it is possible to set different optical phase offsets in the waveguide arms (e.g., total phase shifts of $-\frac{2}{3}\pi$ and $\frac{1}{3}\pi$). In addition, this results in a reduction of length of the modulator as compared with known "push-pull arrangements" in which both waveguide arms are provided with identical electrode arrangements.

Over and above this, it is advantageous to arrange the longest or most significant bit electrode (MSB electrode) on both waveguide arms, each with half of its length. This produces a phase shift in the two waveguide arms that is approximately the same in amount, as it is more complex and elaborate to implement other asymmetrical approaches.

In this context, FIGS. 1 and 2 show the longest or most significant bit electrode (MSB electrode) e15. This electrode is arranged along both waveguide arms 13a, 13b. This arrangement can be configured along the waveguide arms each with half the length.

Furthermore, the arrangement can be configured on the sides of the two waveguide arms that are facing one another—i.e. along the lower side of the upper waveguide arm 13a and along the upper side of the lower waveguide arm 13b, as shown in FIGS. 1 and 2. Therein, at least a part of this MSB electrode e15 can be arranged in the vicinity of the Y-branch 12 of the two waveguide arms 13a, 13b. A further reduction in length can be achieved by using such vicinity of the Y-branch 12.

The second longest electrode e14 is arranged opposite the one section of the MSB electrode e15 along a first one of the two waveguide arms. This second longest electrode e14 can also be arranged in the vicinity of the Y-branch 12 of this first waveguide arm, at least in part.

The remaining electrodes e0 to e13 can be arranged opposite the other half of the MSB electrode e15 on the second one of the two waveguide arms, wherein at least another of the electrodes arranged on the second waveguide arm can be arranged (at least in part) in the bending region of the Y-branch 12 of this second waveguide arm.

This electrode arrangement, shown in FIG. 1, allows reduction of the number of electrode feeds or intersections across the waveguide as compared with the known 12-bit modulator design, resulting in improvement in the optical transmission of the chip.

The lengths of the electrodes correspond to their weighting on the light phase shift. The following Table 1 shows an example of such length weighting of a 16-bit phase modulator. The electrodes e5 to e15 that have a higher significant weighting in their contribution to the light phase shift form a coarse modulator, while the five lowest significant electrodes e0 to e4 are assigned to a fine modulator:

TABLE 1

| Electrode | Weighting/ length value | Fine modulator |
| --- | --- | --- |
| e0 | 14 | F |
| e1 | −13 | F |
| e2 | −15 | F |
| e3 | −19 | F |
| e4 | 22 | F |
| e5 | 30 | |
| e6 | 60 | |
| e7 | 120 | |
| e8 | 240 | |
| e9 | 480 | |
| e10 | 960 | |
| e11 | 1920 | |
| e12 | 3840 | |
| e13 | 7639 | |
| e14 | 15278 | |
| e15 | −30556 | |

The electrodes e0 to e4 which form the fine modulator can be arranged along one or both of the waveguide arms.

Figure 3:
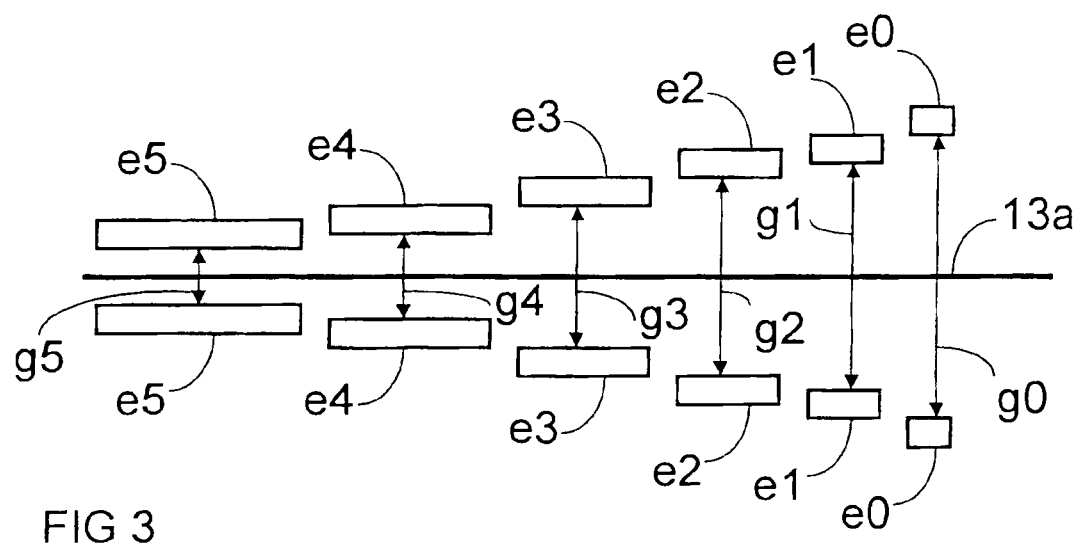
FIG. 3 illustrates an arrangement of the five smallest electrodes of a 16-bit modulator.

FIG. 3 shows distances of the electrodes e0 to e5 from the waveguide arm 13a. The distance between the electrodes on the sides of a waveguide arm that are arranged opposite to each other will also be referred to as gap length g0 to g5 below.

The following table 2 shows an arrangement with a smallest electrode (LSB electrode) e0 that is shorter than the above representation. The weighting of the electrode of a specific length can be influenced by changing the gap length.

TABLE 2

| Electrode | Weighting | Gap length | Electrode length |
| --- | --- | --- | --- |
| e0 | 2 | 35 | 3.5 |
| e1 | 2 | 30 | 6 |
| e2 | 4 | 25 | 10 |
| e3 | 8 | 20 | 16 |
| e4 | 16 | 15 | 24 |
| e5 | 32 | 10 | 32 |
| e6 | 64 | 10 | 64 |
| e7 | 128 | 10 | 128 |
| e8 | 256 | 10 | 256 |
| e9 | 512 | 10 | 512 |
| e10 | 1024 | 10 | 1024 |
| e11 | 2048 | 10 | 2048 |
| e12 | 4096 | 10 | 4096 |
| e13 | 8192 | 10 | 8192 |

TABLE 2-continued

| Electrode | Weighting | Gap length | Electrode length |
|---|---|---|---|
| e14 | 16384 | 10 | 16384 |
| e15 | −32768 | 10 | 32768 |

If the weightings are equated with the associated electrode lengths (in μm), the length of the LSB electrode e0 is only 1 μm. Contrary to current understanding that the shortest electrode should have a certain minimum length of a number of μm (for example 30 μm) such a small structure no longer poses any problem in that considerable progress has been made in structuring technology (e.g., by wafer steppers and imprint lithography).

By suitably arranging the small electrodes and the corresponding feeds to the electrodes, it is still possible to determine even the smallest optical phase shift and to correct it to the desired value using the correction table provided in DE 197 53 427 C1.

When arranged according to Table 2, the five smallest electrodes can be arranged in a certain ratio of gap length to electrode length, with the smallest electrode (LSB electrode) no longer being a length of 1 but rather 3.5. The optical phase shift, however, remains binary and has a value of 1/65536 n.

The optical phase shift is proportional to the electrode length and inversely proportional to the gap length and can be described by the following equation:

$$\Delta\rho = \frac{\pi n^3 r_{33} U L \Gamma}{g \lambda}$$

where:
n effective refractive index of the optical waveguide
$r_{33}$ electro-optical coefficient
L electrode length
g gap length
Γ overlap integral of the electrical and optical field
λ wavelength
U modulation voltage The electrodes are extended in length from position to position while, at the same time, the gap length is increased to achieve the corresponding optical phase shift.

This arrangement, which is shown in FIG. 3, can be implemented as the overlap integral, r, is constant across different gap lengths (e.g., within a range of 8 μm to 30 μm).

The suggested digital integrated optical modulator can be used to implement higher bit resolutions with a fixed length of the modulator or equal bit resolutions with a reduced length of the modulator.

By utilizing the teachings of the invention it is seen that one may realize a digital modulator for a fiber optic signal transmission or measuring device in which a 16-bit digital electrode arrangement can be implemented by an appropriate arrangement of the electrodes while maintaining total chip length.

While the invention has been disclosed with reference to its presently preferred embodiment, it is not limited thereto. Rather, the invention is limited only insofar as it is defined by the following set of patent claims and includes within its scope all equivalents thereof.

The invention claimed is:

1. A digital integrated optical modulator having two waveguide arms and electrodes with different lengths that are arranged along both waveguide arms in or on an optical substrate, wherein the electrodes along a first one of the two waveguide arms are arranged in a manner that is different from that of the electrodes along the second one of the two waveguide arms, and
a longest electrode being the most significant bit (MSB) electrode is arranged along the two waveguide arms so that a first half of the length of the longest electrode extends along the first one of the two waveguide arms, and a second half of the length of the longest electrode extends along the second one of the two waveguide arms.

2. The digital integrated optical modulator according to claim 1, characterized in that the MSB electrode is arranged on sides of the two waveguide arms that are facing each other.

3. The digital integrated optical modulator according to claim 1, characterized in that the second longest electrode is arranged along the first one of the two waveguide arms only and opposite the half of the MSB electrode along the first one of the two waveguide arms.

4. The digital integrated optical modulator according to claim 1, characterized in that the electrodes other than the longest electrode and the second longest electrode are arranged along the second one of the two waveguide arms and opposite the MSB electrode.

5. The digital integrated optical modulator according to claim 1, characterized in that the gaps of electrodes disposed opposite to each other on the two sides of a waveguide arm are different from each other.

6. The digital integrated optical modulator according to claim 1, characterized in that it is formed as a phase modulator.

7. The digital integrated optical modulator according to claim 1, characterized in that it is formed as an amplitude modulator.

8. The digital integrated optical modulator according to claim 1, characterized in that it is formed as a frequency modulator.

9. The digital integrated optical modulator according to claim 1, characterized in that the MSB electrode is arranged on sides of the two waveguide arms that are facing each other.

10. The digital integrated optical modulator according to claim 1, characterized in that the second longest electrode is arranged along the first one of the two waveguide arms only and opposite the half of the MSB electgrode along the first one of the two waveguide arms.

11. The digital integrated optical modulator according to claim 3, characterized in that the electrodes other than the longest electrode and the second longest electrode are arranged along the second one of the two waveguide arms and opposite the MSB electrode.

12. A digital integrated optical modulator having two waveguide arms and electrodes with different lengths that are arranged along both waveguide arms in or on an optical substrate, wherein the electrodes along a first one of the two waveguide arms are arranged in an manner that is different from that of the electrodes along the second one of the two waveguide arms, and
a longest electrode being the most significant bit (MSB) electrode is arranged along the two waveguide arms,
wherein the second longest electrode is arranged along the one of the two waveguide arms and opposite the MSB electrode, and
the electrodes other than the MSB electrode and the second longest electrode are arranged along the second one of the two waveguide arms and opposite the MSB electrode.

* * * * *